(12) United States Patent
Karmarkar

(10) Patent No.: US 9,747,352 B2
(45) Date of Patent: *Aug. 29, 2017

(54) METHOD AND SYSTEM FOR INTERACTIVE GEOMETRIC REPRESENTATIONS, CONFIGURATION AND CONTROL OF DATA

(71) Applicant: Sharada Kalanidhi Karmarkar, Palo Alto, CA (US)

(72) Inventor: Sharada Kalanidhi Karmarkar, Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/958,935

(22) Filed: Dec. 4, 2015

(65) Prior Publication Data

US 2016/0253395 A1    Sep. 1, 2016

Related U.S. Application Data

(63) Continuation of application No. 13/740,108, filed on Jan. 11, 2013, now Pat. No. 9,244,986.

(51) Int. Cl.
*G06F 17/30* (2006.01)

(52) U.S. Cl.
CPC .. *G06F 17/30554* (2013.01); *G06F 17/30112* (2013.01); *G06F 17/30533* (2013.01); *G06F 17/30991* (2013.01)

(58) Field of Classification Search
CPC .................................................. G06F 17/30
See application file for complete search history.

(56) References Cited

U.S. PATENT DOCUMENTS

| | | | |
|---|---|---|---|
| 2004/0205036 A1* | 10/2004 | Prabhu | G01N 23/04 706/19 |
| 2005/0246155 A1* | 11/2005 | Brumitt | G06F 17/30 703/22 |
| 2008/0063264 A1* | 3/2008 | Porikli | G06K 9/00369 382/159 |

OTHER PUBLICATIONS

A.S. Lewis, "Nonsmooth Analysis of Eigenvalues," Oct. 1998.*

* cited by examiner

*Primary Examiner* — Apu Mofiz
*Assistant Examiner* — Farhad Agharahimi

(57) ABSTRACT

In one exemplary embodiment, a computer-implemented method includes obtaining a data set from a data source. The data set is prepared for an analysis operation according to a problem type. A result is generated from an interactive geometric node based a geometric property of the data set. A specified condition is determined with the result from the interactive geometric node based on a query to the interactive geometric node. A system's geometric configuration is determined. A geometric control criterion is determined.

10 Claims, 5 Drawing Sheets

METHOD AND SYSTEM FOR INTERACTIVE GEOMETRIC REPRESENTATIONS, CONFIGURATION AND CONTROL OF DATA

CROSS-REFERENCE TO RELATED APPLICATIONS

This application claims priority to U.S. patent application Ser. No. 13/740,108 titled A METHOD AND SYSTEM FOR INTERACTIVE GEOMETRIC REPRESENTATIONS, CONFIGURATION AND CONTROL OF DATA filed on Jan. 11, 2013. This patent application is hereby incorporated by reference in its entirety.

BACKGROUND

1. Field

This application relates generally to the use of geometric data analysis to represent the dynamics of a changing set of data, and use of this analysis for feedback and iterated control of the systems represented by the data.

2. Related Art

Conventional methods of analyzing data may be ineffective for datasets that represent interactive systems that may evolve in nonlinear manner. Improved methods of representation and interactive system control are desired.

BRIEF SUMMARY OF THE INVENTION

In one exemplary embodiment, a computer-implemented method includes obtaining a data set from a data source. The data set is prepared for an analysis operation according to a problem type. A result is generated from an interactive geometric node based a geometric property of the data set. A result is also generated from an interactive geometric configuration node based on geometric configuration properties of the data set. A set of geometric controls is also generated. The set of geometric controls may be iteratively used to control the state of the geometric configuration node. A specified condition based on the interaction between the results of the geometric configuration node and the geometric control node is determined. The result of the condition may result in further directed action.

Optionally, the data set can be a digital interaction data. The data set can be biometric data from a biosensor. The data set comprises a previous result of another interactive geometric node. The results from the interactive geometric node can be a geometric representation, a geometric computation or a geometric decision. The data set can be a previous result of an interactive geometric configuration node or a new data stream to be analyzed by the geometric configuration mode. The results from the interactive geometric configuration node can be a geometric representation, a geometric configuration, a geometric computation or a geometric decision. The results from the interactive geometric control node can be a set of controls that in some manner could influence the present or future state of the data represented in the geometric configuration node. This new data could be used by the geometric configuration node for further analysis and then again by the geometric control node for further geometric control related analysis.

BRIEF DESCRIPTION OF THE DRAWINGS

The present application can be best understood by reference to the following description taken in conjunction with the accompanying figures, in which like parts may be referred to by like numerals.

The Figures described above are a representative set, and are not an exhaustive with respect to embodying the invention.

DETAILED DESCRIPTION

Disclosed are a system, method, and article of manufacture of geometric configurations, and iterated interactive geometric systemic control of data. Although the present embodiments included have been described with reference to specific example embodiments, it can be evident that various modifications and changes may be made to these embodiments without departing from the broader spirit and scope of the particular example embodiment.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Exemplary Process

Figure 1A:
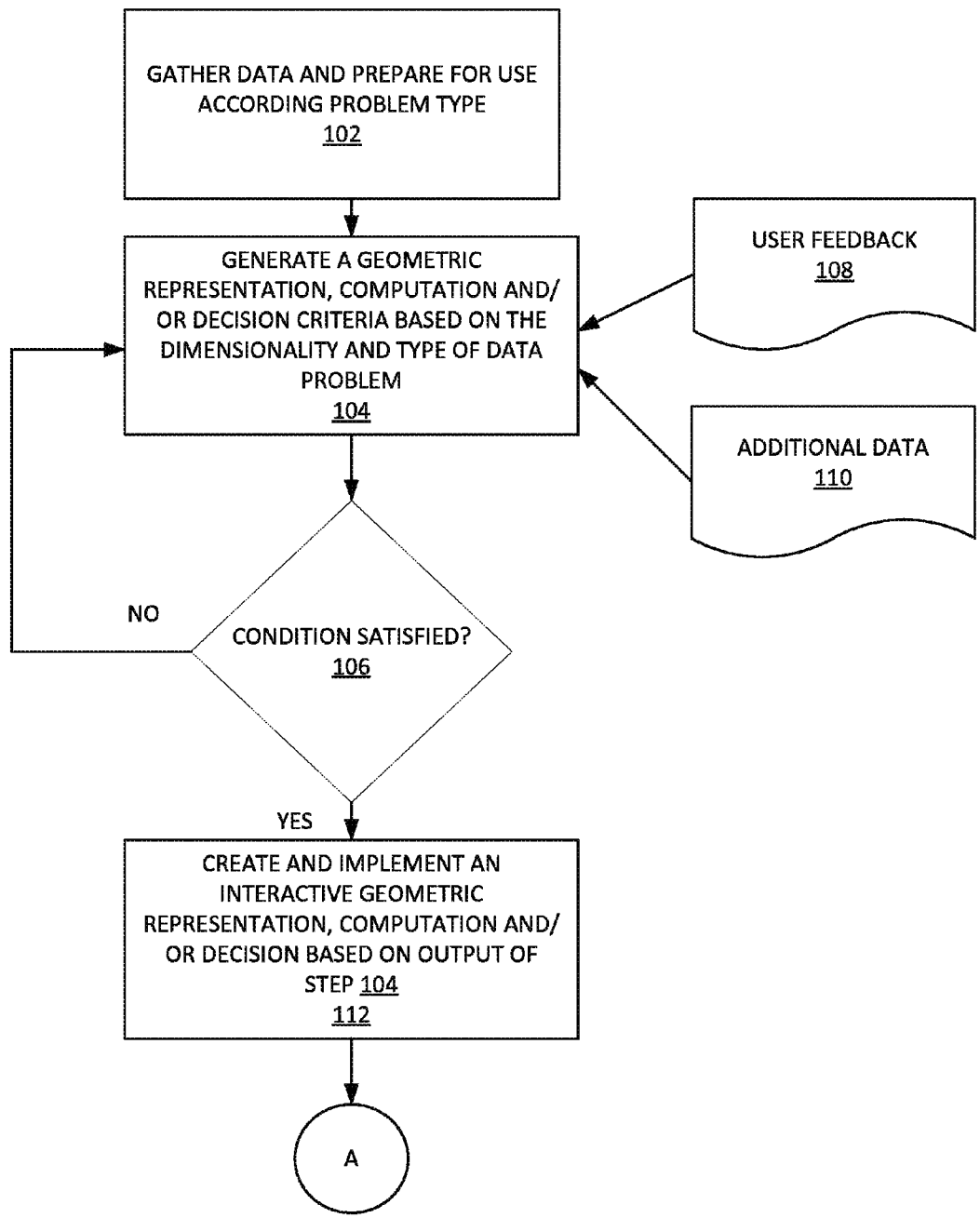
FIGS. 1A-B depicts, in block diagram format, a process of geometric representations, configurations, iterated interactive system control, use and decisioning of data, according to some embodiments.
Figure 1B:
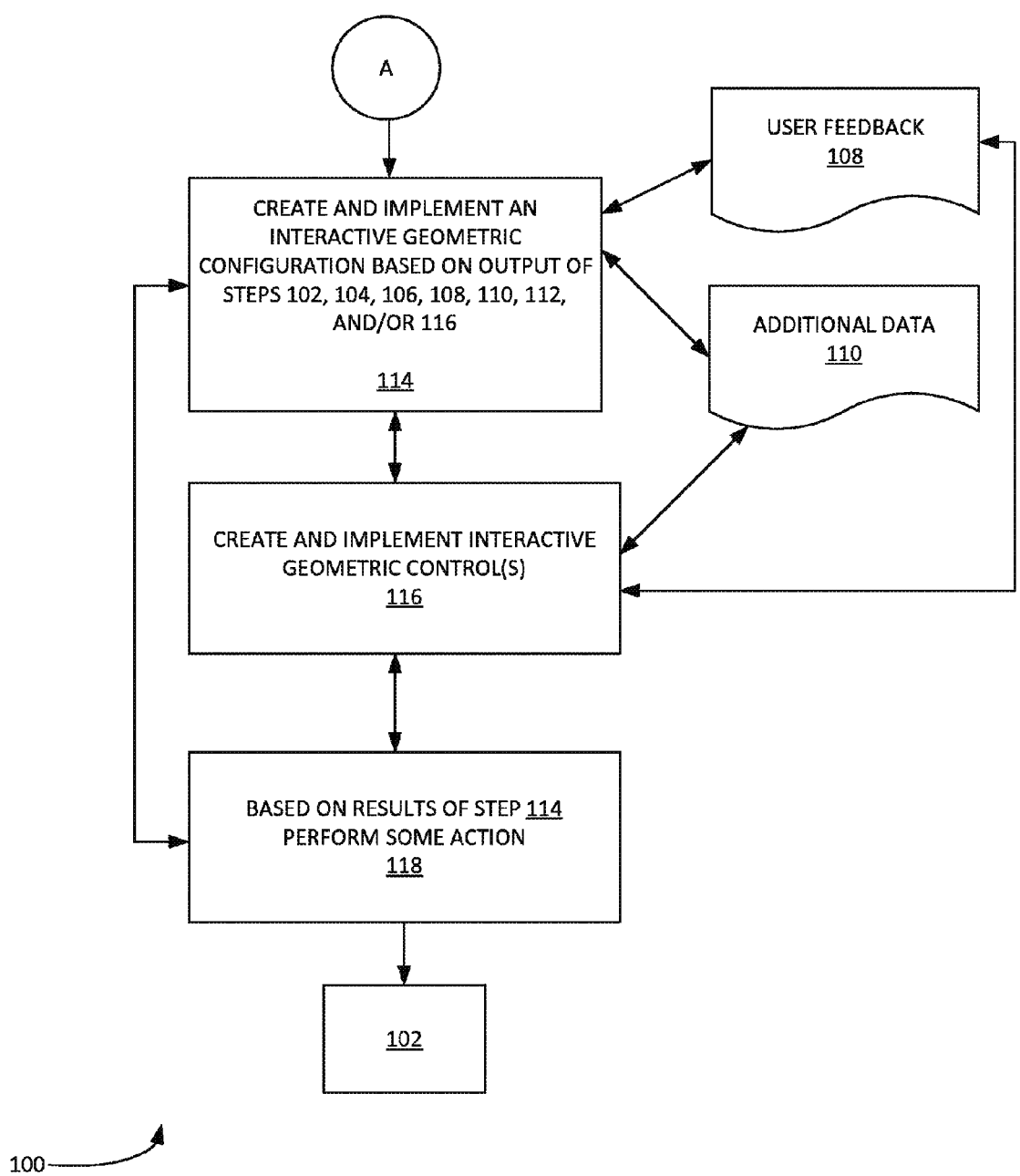

FIGS. 1A-B depict, in block diagram format, a process 100 of geometric representations, configuration, iterated interactive system control, use and decisioning of data, according to some embodiments. In step 102 of process 100, the data is gathered and prepared for use according to data type and problem type. The data source can be structured or unstructured data sets. Exemplary data sources can include, inter alia, financial data (e.g. tick data), health data (e.g. biometric data), news/political data (e.g. news source data feeds), social data (e.g. social network data, inter-user interaction data, social commentary, etc.), ecological/nature data (e.g. geographic/weather data like temperature, wind velocity, pollen count, etc.), a combination of heterogeneous data and the like. It is noted that, in some example embodiments, data sources can include type of data used in the example use cases provided infra. It is also noted that data source can include previously generated geometric representations of data, data usage, user feedback and problem statements for further analysis, representation and use. In addition, data from a data feed can be obtained, stored, filtered, parsed, categorized and the like. The data can be formatted with a markup language (e.g. a set of rules for encoding data in a format that is both human-readable and machine-readable such as an XML format). It is noted that in one example embodiment, a markup language can be developed and/or selected based on various attributes of the data and/or data source. In one example, a snapshot of data from data source can be obtained, tagged with XML (or an XML-like markup language) and stored in a database. The data can be tagged with any tags deemed appropriate for the particular data attributes (e.g. time stamps, location information, data type, data source, etc.). Tags can be indexed and/or sorted according to an indexing scheme. Optionally, a list of indexed and sorted tags and meta-tags can be generated. An administrator can specify any knowledge-hierarchy and/or knowledge-topology, tag-meta tag relationship, importance, weighting rank, storage criteria, axis (e.g. coordinate, radial), scale, sequence and/or data source to be included in the list. The list can itself include a set of lists or arrays with list elements. The system may be more difficult to understand and control when nonlinearities are involved. For this purpose, geometric techniques of analysis and control may be employed.

In step 104 of process 100, a geometric representation, use and/or decision criteria can be generated based on the geometric attributes, properties, predicates and operations of the data and data problem(s) presented by the output of process 102. Step 104 can utilize the output of step 102. A geometric representation can be an arrangement or configuration or composite of a plurality of primitives (such as a point or vertex) such that the relations between primitives can be specified as properties (such as angles, distances etc.). In addition, properties of the composite representation (such as boundary, volume etc.) can be derived from configuration properties of the primitives relative to each other. In addition, measures (such as area) on the properties can be computed; predicates (such as maximum area) can be specified, operations (such as division based on maximum area) can be performed. A geometric use can include using a geometric representation to understand the configuration of geometric primitives such as how points are distributed relative to each other and use this understanding for possible further action. For example, points located on the vertices of an equilateral triangle and points located on the vertices of a scalene triangle can have different relative configurations. A geometric decision criteria can include a condition where the criteria may be dependent on some explicit, implied and/or computable property of a geometric object and/or primitive. The property could relate primitives to each other or describe the composite geometric object. One or more geometric representations, uses and/or decisions criteria (and/or decisions, see step 112) can be included in a geometric node. In this way, results from a geometric node can be a composite of these elements.

In one example, step 104 can implement an iterative sequence of geometric operations such as going from a low dimension to high dimension representation of the data from step 102. For example, step 104 can include substeps that convert one node (vertex) to a line to a triangle, and/or a 'simplicial complex' (e.g. a polyhedron). It can be determined where the borders of the simplexes are, which vertices to delete and which vertices to maintain. As necessary, additional computations such as computation of cycles of actions, factoring out sub-spaces, creating composites of sub-spaces, creating sequences of relevant mappings can be implemented. The appropriate geometric computations on the aggregate geometric node (and/or elements thereof) can also be computed.

In step 106, it can be determined whether a specified condition about the output of step 104 has been satisfied. For example, a condition can be user specified (e.g. a query to the user such as "are you happy with this representation" and/or "choose one of these five geometric representations", etc.). A condition can be an algorithm/problem complexity metric. This can be a geometric representation problem that can be solved in a reasonable time period before the user gets bored and shuts down the application. In another example, the condition can be memory determined. For example, the condition can be some action that a geometric representation may allow a user of a computing device to perform. If the condition is not satisfied (e.g. a 'no' result in process 100) then process 100 can return to step 104. It is noted that additional user input 108 and additional data 110 can be included at this time into step 104 in order to provide a modified output of step 104 in each subsequent iteration until condition 106 is satisfied. If the condition is satisfied (e.g. a 'yes' result in process 100) then process 100 can proceed to step 112. It is noted that, in some example embodiments, the condition can be based on the complexity of the problem the geometric node is designed to solve and/or various time/resource/system constraints applied to the geometric node. In this way, an iterative loop can be included in process 100 whereby the output of the geometric node undergoes various degrees of refinement. An updated version of the results of the geometric node can be developed based on such inputs as user feedback or additional data (e.g. updated data from the data source). A mechanism can be provided for process 100 to interact with a user and solicit feedback with respect to the attributes of the geometric node. Data of user interaction can be stored in the geometric node for future analysis and use. The final version of the output of the geometric node output of step 104 can be a composite of one or more alternate sub-representations.

In step 112 of process 100, an interactive geometric node (e.g. can include one or more geometric representations, uses and/or decisions) can be created and implemented based on output of step 104. In step 112, the geometric node can be provided with a conditional logic allowing it to interact with queries provided by other nodes in a network.

For example, when prompted by a query, the geometric node can check for one or multiple specified conditions. For example, the output of an interaction with the geometric node can be a simple [1,0] and/or a sequence of 'Yes, NO' conditions (e.g. an array with element [1,1,1,1,0,0]) depending upon the complexity of the conditional question. The results of the geometric node as well as the conditional check based on the results are available for storage, messaging and query. The data involved in step 112 is again amenable to storage and query anywhere in a network.

Step 114, the geometric configuration node, may understand the dynamic properties of a data system, and may do so with specifying properties, mappings, objects, computations, operations, associations and constraints. With the help of associations, it may associate a physical property with a mathematical variable.

The geometric configuration node may have mappings from one space to another space with some specified set of properties. These properties may be useful in characterizing, for example, the geometric properties of a space and the dynamic properties of a system. An example of a mapping is a homeomorphism, a one-one map where the map and its inverse are continuous. This sort of mapping helps us define other objects, such as a system of coordinates (or charts.)

If we further require a Homeomorphism to have a differential structure, a mapping called a diffeomorphism can be created, where the map and its inverse are infinitely differentiable.

A mapping may be useful because it can help us define geometric objects that help us characterize the properties or dynamics of a space and a system. An example of an object so defined is a manifold. A manifold may be understood as a geometric object that can be used to describe and relate local as well as global attributes of a space. A manifold may be understood in context of a homeomorphism. A manifold may be endowed with additional properties such as differentiability on infinite order (infinitely differentiable), and thereby create another type of manifold called differentiable (smooth) manifold. A manifold can be within another manifold, the former being called a submanifold. The local properties of a manifold may be described in terms the local coordinate system. The system may not be able to cover the entire manifold with just one coordinate system. So all coordinate charts created on a manifold are collectively called an atlas.

The geometric configuration node may develop useful associations using geometric objects like manifolds. For example, manifolds may be used describe the configurations of a mechanical or robotic object in terms of positions, orientations, momentum, and actuated actions such as rotations, translations, deformations etc. In this manner of interaction, the physical system may be controlled. Manifolds may also provide an association from the mathematical space of geometries created from data to the real world physical space of forces. These associations may be used to influence and control the physical space iteratively.

The geometric configuration node may also define functions and other objects that particularly pertain to characterizing, representing and analyzing changes in the dynamic system, representable on a manifold. For example, the rate of change of a function may be given. Similarly, a tangent vector acting along a curve on the manifold may also be described. A collection of tangent vectors (tangent spaces) can also be defined and studied. Further, a tangent bundle can be defined as the disjoint union of all tangent spaces. A vector field can associate each point on a manifold with a tangent vector. A pairing of a differential of a smooth (infinitely differentiable) function with a vector field may create a useful object called the Lie derivative. Object the geometric configuration node may examine is a covector. Other examples of objects may be cotangent bundle, cotangent spaces, Lie brackets and integral curve. A space of vector fields with a Lie structure may be defined. Other properties (such as geodesic invariance) may also be studied.

In Step 116, Conditional logic based on geometric configuration node is developed. The geometric control node may develop geometry based control criteria to interact with the external physical system. If it is determined that the system is amenable for geometric control, then further geometric analysis of the dynamics of the state space could be performed. The geometric configuration node can perform this type of analysis and develop conditions (such as optimality) that may determine the configurations appropriate for the system.

In the geometric control node we may study the properties of the system using the objects particularly as it relates to assessing system controllability on various geometric criteria. Indeed, a key part of developing controls on a dynamic system is assessing whether future states are reachable from current states. As an example, a computation that enables this is the Lie bracket. For example, in the context of developing nonlinear controls on a dynamic system, the control node may characterize a set of system controls such as Lie group of rotations.

It is understood that this is only a representative sample of objects, measures, properties, computations etc. used in understanding and characterizing the dynamics of a system from a differential and geometric point of view. The geometric node, geometric configuration node and the geometric control node may thus together characterize the dynamics and control of a variety of systems. It is noted that these techniques have been employed in the maneuvering of rigid bodies, robotics, autonomous vehicle control, underwater bodies, aeronautical maneuver, locomotion maneuver and such—systems where the dynamics of the system can be described and analyzed on a geometric object such as a manifold.

Additionally, there is applicability of these techniques and methods where systems including the above are joined with data from mobile devices (connected with sensors), digital data, biometric data, environment sensors, 3-D printing/additive manufacturing.

It is noted that each geometric node, the geometric configuration node and/or geometric control nodes can retain a memory of the type of problem, the parameters, the volume, the geometric approach, the algorithms, the outcome of its implementation, etc. The next time a similar problem is presented to the geometric node, a search of its memory repository (as well as possibly other search sources) to see if the data type, problem type, volume type (and the like) have been previously encountered. Corresponding implementations and outcomes can then be analyzed for reuse.

In step 118, a specified action can be performed by a computing system based on the results (e.g. the generated results of the geometric node and/or queries addressed to the geometric node). For example, the geometric node can initiate a search operation. In another example, the results of the geometric node can be made available to join a network and be queried.

Figure 2:
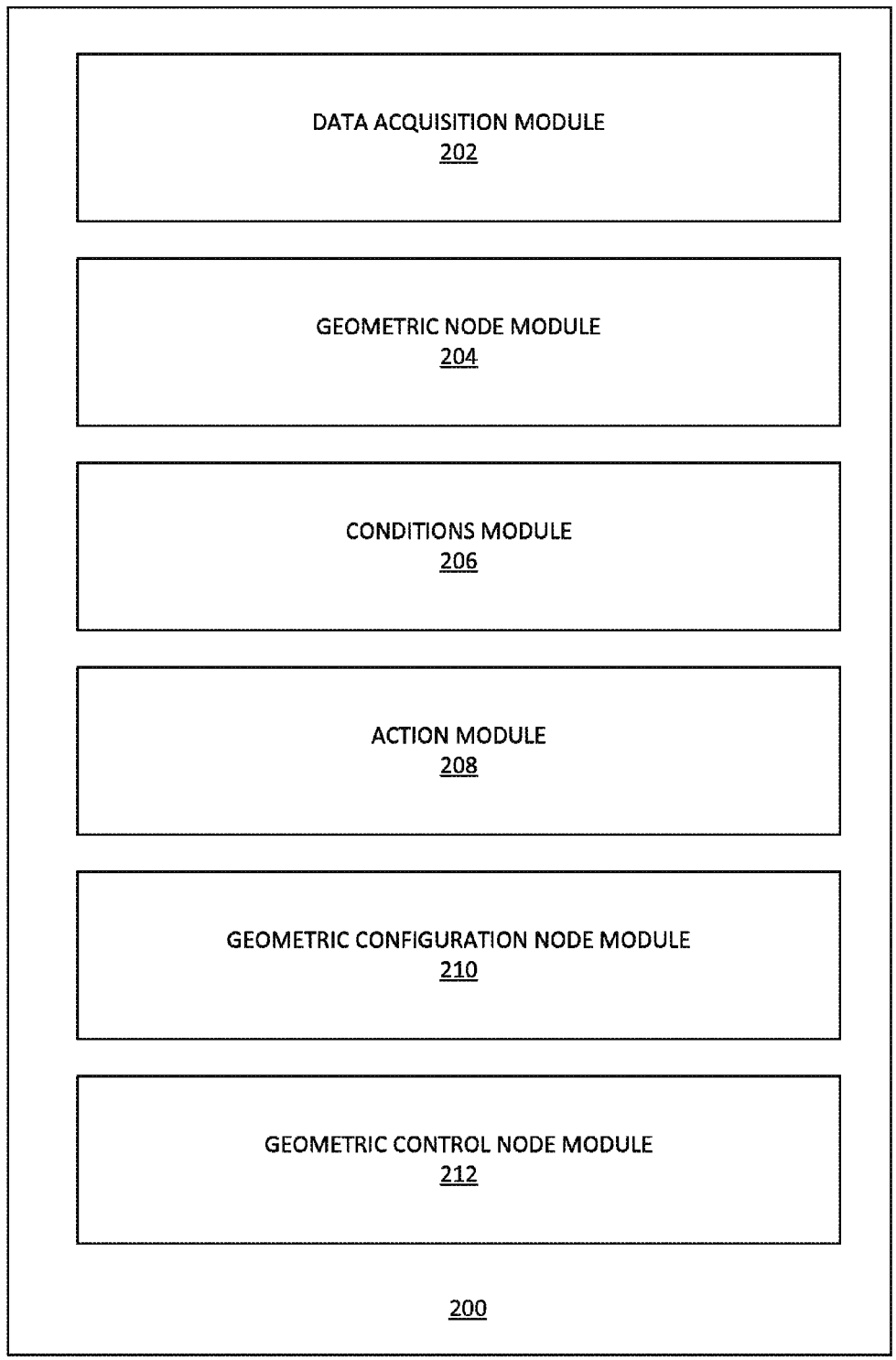
FIG. 2 depicts, in block format, an example system for implementing process 100 and various use cases described herein.

FIG. 2 depicts, in block format, an example system 200 for implementing process 100 and various use cases described herein. System 200 can include a data acquisition module 202. Data acquisition module 202 can gather data and prepare for use according to problem type. Data acquisition module 202 can include submodules and functionalities such as parsers, search engines, sorters, metadata tag readers and taggers, dictionaries, tables to match data sources to data types, etc.

System 200 can include a geometric node module 204. According to various embodiments, geometric node module 204 can represent a space (e.g. as a set of data points) through appropriate geometric primitives, constructions and/or objects (such as vertices, lines, triangles). Geometric node module 204 can specify attributes of the geometric primitives, constructions and/or objects. Geometric node module 204 can develop appropriate metrics of raw, intermediate and/or composite constructions, objects and/or primitives. Geometric node module 204 can develop predicates based on the specified attributes and/or properties and/or metrics. Geometric node module 204 can operate on geometric objects, constructions and/or primitives based on (an iterated or sequenced or weighted or otherwise prioritized) set of predicates. Geometric node module 204 can recommend decisions based on the results of operations, predicates and/or attributes. Geometric node module 204 can retain a memory of the above for future geometric analysis.

Various example implementations of geometric node module 204 operations are now provided. In one example, geometric node module 204 can represent a space (e.g. a set of data points) through appropriate geometric primitives, constructions and/or objects (such as vertices, lines, triangles). The purpose of a geometric construct can be to represent and/or encode geometric primitives and/or components (e.g. a fundamental geometric object such as a point) and in relation to itself and others in the data set to which it belongs. Examples of distinct components of a geometric object can be, inter alia: vertices, facets, edges, and the like. An example of a geometric construction can be an incidence matrix. An incidence matrix can represent the facets and vertices of a one or more geometric objects in relation to each other. A geometric construct can include different versions, for example, differing in row/column permutations but otherwise representing the same geometric object. A geometric construct and/or object can represent different underlying data points. The underlying data point can be real numbers, integers, rational numbers and the like. Examples of other geometric objects can include vectors, hyperplanes, triangles, cubes, ellipses, ellipsoids, spheres, polyominoes, etc.

Geometric node module 204 can specify attributes of geometric primitives, constructions and/or objects. Attributes may be labeled or unlabeled. Geometric constructions and/or objects can have properties that can be specified, computed or studied in other manner. Examples of attributes and properties can include, inter alia: angles, symmetry, boundedness, polarity, vertex order and/or ranking (e.g. based on some attribute).

Geometric node module 204 can develop appropriate metrics of raw, intermediate and/or composite constructions, objects and/or primitives. For example, the properties and attributes of a geometric construct and/or object can be studied and measured with appropriately developed metrics. Attributes may be labeled or unlabeled. Examples of metrics can include, inter alia: number of vertices, number of edges, number of faces, area, perimeter, volume, surface area, angle, radius, spread, density, distance (e.g. in various forms such as a geodesic, power distance, skew, convex, link, separation, Hausdorff and the like), vertex path, etc. The error/complexity of implementing, rendering, computing geometric constructs through different algorithms can also be measured and specified.

Geometric node module 204 can develop predicates based on the specified attributes and/or properties. The properties and/or attributes of a geometric construct can be chosen, ordered, ranked, sequenced or in any other form selected or highlighted based on predicates in which certain type of logic and/or reasoning can be embedded. Examples of predicates can be, inter alia: checks for equality or inequality of an attribute, checks for consistency, monotonicity, periodicity, intersection, (local or global) minimum/maximum/optimized (e.g. angles, path/cycles, distance time, cost, etc.), sequence/order specification, range/interval, sign (positive/negative or absolute value), ranking/weighting criteria, uniqueness criteria, critical point. Predicates may be Boolean, exact and/or approximate. In addition, they may be hierarchical, layered, weighted, conditional or a composite of other predicates.

Geometric node module 204 can operate on geometric objects, constructions and/or primitives. Operations can be categorized and accessed individually or as part of a family of operations. Operations can be performed on a geometric object and/or constructions. For the purposes of the operation, attributes, properties, metrics, predicates of the geometric object and/or construction may be referenced. These may reflect the original configuration of the object and may in some form re-configure or in some other form morph or transform the geometric object. The original geometric object, the operation that changed it as well as the new object can be stored in memory and accessed anywhere in the network.

Examples of Operations can be, inter alia: division/separation/removing geometric objects and/or primitives. Examples of division can include, inter alia: dividing based on same object (e.g. triangles with a specified predicate), dividing into different types of geometric objects such as a triangle, cube, tetrahedron and/or polytope, division based on shared attribute or property (e.g. distance), division with some predicate and/or attribute combination (e.g. at most/at least K vertices, packing/volume, distance, or spread).

Geometric node module 204 can connect geometric objects and/or primitives. Example of connection operations include, inter alia: connecting a set of the same object into a composite (e.g. triangles with a specified predicate), connecting different types of geometric objects into a composite triangle, cube, tetrahedron, polytope, connecting based on shared attribute and/or property (e.g. adjacency, distance, proximity), connecting with some predicate and/or attribute combination (e.g. at least K vertices, packing/volume, distance, or spread).

Geometric node module 204 can perform intersections or check for co-incidence, degree of intersection or lack of intersection. It can bring together more than one similar and/or different geometric object so they are not necessarily co-incident. If objects are co-incident then the configuration and location of all of the geometric primitives can be specified in one set. Example intersection operations can include, inter alia: intersecting half-spaces, circles.

Geometric node module 204 can perform other operations such as, inter alia: developing a boundary/perimeter (e.g. convex hull of points), develop an ordering (e.g. lexicographic ordering of vertices), develop a trajectory/path (e.g. a path of vertices of a cube), develop a grouping (e.g. a grouping of geometric objects by properties such as reflection or symmetry), develop a weighting (e.g. by indices or metrics), check for further reducibility/irreducibility, develop a randomization/derandomization (e.g. geometrically-defined random behavior; probability of events specified by random geometric configurations, etc.). The operations can include, inter alia: one-time operations, repeated operations, weighted operations, hierarchical operations, multi-level operations recursive operations, labeled/non-labeled operations, etc. All of the intermediate or final results of the geometric node: properties, predicates, metrics, operations, representations may be available for use and query.

Geometric node module 204 can recommend decisions based on results of operations, predicates or attributes. Attributes, properties and/or predicates of the geometric object (e.g. as represented by original data or reconfigured through operations) can be used to make a decision. Examples of decisions can be, inter alia: optimization (e.g. arriving at a feasible set given geometrically defined constraints), sequencing (e.g. arriving at a sequence of geometric primitives, objects and/or constructions that fulfill properties and/or predicate-defined criteria), and search (e.g. searching for geometric primitives, objects or constructions that fulfill properties and/or predicate-defined criteria. Decisions can also include a composite of other decisions. Geometric node module 204 can retain a memory of past operations, decisions and representations for future geometric operations.

Conditions module 206 can implement some conditional logic based on the outputs of geometric node module 204. This module can be amenable to storage, messaging and query anywhere in a network. Action module 208 can perform a specified action can be performed by a computing system based on the results (e.g. the generated results of the geometric node and/or queries addressed to the geometric node). System 200 can be combined with the various other functionalities described herein to perform process 100 as well as any additional use cases.

These techniques may be used to model the individual and/or collective dynamics of one or more objects on a (manned or unmanned) terrestrial, aquatic, aerial vehicle and/or other environment. As such, they may model, measure or influence external physical forces such as drag, torque, kinetic energy. They may determine, compute or perform related computations, decision criteria or decisions entailing, for instance, momentum, orbit parameters, group rotations, position, orientation, configuration space, trajectory, maneuvers, acceleration, envelope, steering actions, rotation, deformation, equilibrium position, group shape, feedback, spatial relations, trajectory, kinematic control and such. In addition, the approach outlined herein may be used in connected network systems, where data from connected mobile devices with sensors is combined with digital data, biometric data and environment data in a manner that part or whole of the dynamics of physical and/or virtual system is amenable to iterative geometric modeling, control and/or influence as outlined in this invention. Several examples are now provided.

In one example embodiment, relevant data regarding the location configuration (distance, angle of orientation, geographic coordinates etc.) of a vehicle can be received on a mobile device in step 102. In step 114, it is determined to be a dynamic problem with potential for geometric control. In step 116, a potential geometric control involving optimal parking is determined. In conjunction with step 116, in step 114, the geometric configurations and required actions (e.g. move back five (5) inches, rotate n degrees) can be computed. In step 118, they are communicated through the mobile device and appropriate actions on the remote vehicle are performed. Data on the new position can once again be received in step 102, and steps 102-118 could be performed iteratively until the appropriate ending state is achieved. It is noted that while this example describes a remote terrestrial vehicle, this invention can also be applied where such geometric configuration computations and decisions can be done in a remote setting and relevant information needs to be communicated through one or more connected devices.

In one example embodiment, relevant aeronautical data regarding the configuration (lift force, speed, drag, wing characteristics such as span, turbulence flow) of an airplane is received on a mobile device in step 102. In step 114, it is determined to be a dynamic turbulence problem has potential for geometric control. In step 116, a potential geometric control involving optimal turbulence control is determined. In conjunction with step 116, in step 114, the geometric configurations (for example, geometric wind configurations such as origami shapes) and required actions (speed changes) can be computed. In step 118, they are communicated through the mobile device (or performed natively on the airplane). A flexible materials object on the airplane may receive the communication and change its shape to respond to the turbulence in a geometrically appropriate manner. The change in shape of this object, alongside coordinated geometric action (akin to a bird flapping its wings) may be performed on the airplane. Data on the new configuration is once again received in step 102, and the steps 102-118 could be performed iteratively until the appropriate ending state is achieved. It is understood that while this example describes a remote airborne object, this invention can also be applied where such geometric configuration computations and decisions must be done in a remote setting and relevant information needs to be communicated through one or more connected devices.

In one example embodiment, relevant seaborne data regarding the configuration (lift flow) of an underwater vehicle is received on a mobile device in step 102. In step 114, it is determined to be an underwater flow problem with potential for geometric control. In step 116, a potential geometric control involving flow control is determined. In conjunction with step 116, in step 114. It can be determined that changing the physical characteristics of the underwater vehicle might provide appropriate geometric flow control. In step 118, the parameters of the changes are communicated through the mobile device (or performed natively on the underwater body). A flexible materials object on the underwater body may receive the communication and change its physical characteristics (such as stiffness) to respond to the underwater flow problem in a geometrically appropriate manner. The change in physical properties of this object, alongside coordinated geometric action (speed, orientation, rotation) may be performed on the underwater object. Data on the new configuration is once again received in step 102, and the steps 102-118 could be performed iteratively until the appropriate ending state is achieved. It is understood that while this example describes a remote underwater object, this invention can also be applied to instances where such geometric configuration computations and decisions must be done in a remote setting and relevant information needs to be communicated through one or more connected devices. Other examples where this invention can be applied is the reconfiguration of materials with respect to packaging—where the shape or other hardness properties of a packaging object could be altered as a response to geometric configuration and control decisions driven by parameters such as temperature, humidity, time to ending location, etc. Similarly, this invention can be applied to delivery of potentially health-impacting chemicals such as medical drugs, where the amount, timing, sequence properties of a medical drug delivered intravenously could be altered as a response to geometric configuration and control decisions driven by parameters and biometric data feeds such as body temperature, blood pressure etc.

Steps 102-118 can be performed iteratively until the appropriate ending state is achieved. It is understood that while this example describes an interactive digital system, this invention can also be applied where such geometric configuration computations and decisions must be done in a remote setting and relevant information needs to be communicated through one or more connected devices. Other examples where this invention could be applied could be reconfiguration of digital content, text processing/natural language processing outputs, or other material with respect to user interaction where the subject, visual attributes or other digital media could be altered as a response to geometric configuration and control decisions driven by parameters such as viewer interest, viewer biometric response, viewer history, live media information, environment data etc.

Steps 102-118 can be performed iteratively until the appropriate ending state is achieved. It is understood that while this example describes an interactive trading system, this invention can also be applied where such geometric configuration computations and decisions must be done in a remote setting and relevant information needs to be communicated through one or more connected devices. Other examples where this invention could be applied could be reconfiguration of trading decisions with respect to user's financial portfolio where the amount, volume, purchase or sale decision or other trading decision could be altered as a response to geometric configuration and control decisions driven by parameters such as volatility, risk, correlations, cash position etc.

While the above examples show instances of dynamic response of the invention to the environment, it is noted that the invention may retain a memory of the parameters, constraints and other information relating to its decisions. This memory may guide future interactive geometric decisioning. In this manner, intelligence from one set of geometric decisions may influence future intelligence relating to geometric decisions.

Geometric configuration node module 210 can understand the dynamic properties of a data system, and may do so with specifying properties, mappings, objects, computations, operations, associations and/or constraints. It may also associate a physical property with a mathematical variable. It uses all of these inputs to determine appropriate geometric system configurations which can drive decisions. An example of an object it may determine is a manifold.

Geometric control node module 212 can study the properties of the system using the objects particularly as it relates to assessing controllability of system based on various geometric criteria. Indeed, indeed in some examples, a part of developing controls on a dynamic system can include assessing whether future states are reachable from current states. As an example, a computation that enables this can be the Lie bracket. In the context of developing nonlinear controls of the dynamic system, the control node may characterize system controls as Lie group of rotations.

Several example use cases of process 100 are now provided. In one example use case, a large scale data (e.g. foreign exchange data—AUS/USD 60,000 ticks/day) can be received. It can be determined whether the system has previously addressed this type (foreign exchange data) and/or volume (60,000 ticks) of data. Actions can be performed based on the geometric node. Alternate geometric representations can be determined based on data, data attributes, properties, error/precision level, predicates, operations computations, problem needs etc. For example, computations on or more triangulations of data points can be performed based on data attributes such as density, price distance, etc. Geometric object (triangulation) operations can be performed by intersecting it with geometric attributes of constraints (e.g. existing trade positions, maximum price risk and projected geometric attributes of the next day's trades and perhaps user specified preferences). Based on these attributes and constraints, a geometric optimization object can be specified and made available anywhere in the network. A set of trade recommendations can be made based on the geometric object. Conditions can be checked. An example of a condition can include the value of a profit from a trade. Optionally, the metric can be user-specified. Based on condition, the process can continue to recommend or work through step 104 of process again to make another decision based on additional data/user feedback. Some action can be performed. For example, retains memory of problem and approach for future geometric analysis.

In another example use case, process 100 can be utilized in search methodologies such as with large scale datasets and/or local datasets. A geometric search object can be created. The geometric search object can represent search object with appropriate representation of the object's type/primitives, attributes, predicates, and/or metrics and/or operations. Attributes of the geometric search object can be available to be saved and shared anywhere in a network. The geometric search object can be available for further analysis or re-configuration under geometric operations. Examples of data that the search can include, inter alia: economic data, digital footprint data, environment data, biometric and/or ecosystem data. Examples of economic data can include, inter alia: consumer data (e.g. point of sale data, user behavior, demographic data); supplier data (e.g. supply chain data, manufacturing data, transport/logistics/routing data, sale, revenue, pricing, margins, industrial data); financial data (e.g. prices and other attributes of various instruments in the financial markets such as equity asset prices, foreign exchange prices, interest rates, instrument prices, options prices, asset-backed security prices etc.); and/or macroeconomic data (e.g. unemployment, surveys etc.). Example of digital footprint data can include audio, video, photos, social media (e.g. text, interaction data), travel/log, global positioning system (e.g. GPS), kernel, i-node data logs of events on devices (e.g. from application layer down to the network layer). Examples of biometric data can include heart rate, blood pressure, eye tracking, brain wave, galvanic skin response data, oxygen levels, cortisol levels, and the like. Examples of environmental data can include GPS, wind, sunshine, carbon footprint. An example of ecosystem data can include bird sound recordings. It is noted that heterogeneous data can be combined for purposes of solving a data problem.

With these diverse and heterogeneous types and sources of data, searches can be performed for certain data elements in a data set. Process 100 can be implemented during a search operation. Data can be received. The data can be from the economic data, digital footprint data, environment data, and/or ecosystem data categories. The data can be prepared for use. For example, the data can be scaled, possible errors can be identified and corrected, etc. Acceptable tolerances of error/time can be identified. Actions can then be performed based on the results of the geometric node. An underlying data set can be defined. The geometric search object can be defined. The geometric constructions can be defined. As described in the geometric node, geometric representations and/or constructions can be based on data, data attributes, properties, error/precision level, predicates, computations, problem needs etc. For example, the geometric search object can be represented as: a circle with some notion of distance/radius; a triangle with some order/relation of vertices; a rectangle with some uniqueness criteria and/or hierarchy weight. An algorithm (e.g. among a library of several embedded in the geometric node) can be chosen. Optionally, alternative algorithms can also be selected to construct and operate on geometric search object. The underlying data set (raw or prepared previously) can be traversed by geometric operations. Example geometric operations can include, inter alia: grouping/dividing the data set (by attributes/properties and/or any geometric search objects found); weighing/recalibrating data sub-set based on geometric search objects located or not located; mapping trajectory/path of geometric search object in data set; and/or iterating/recursively performing geometric operations. Next, conditions can be checked. For example, it can be determined whether geometric search objects were found with acceptable levels of error and in acceptable time or steps. If not, then an appropriate previous step(s) can be performed again (possibly including additional data or user feedback). If the condition is satisfied, then the process can continue.

Next, an output such as a representation and/or computation can be provided. Examples can include a geometric representation/construction of the underlying data set, the geometric search object, alternate implementations of geometric algorithms performing geometric operations, computations/metrics/attributes/predicates of the geometric search object etc. Based on this output, various operations can be performed. For example, a message that includes these outputs can be sent throughout the network and/or to specific entity in the network. A message can be sent to some entity in the network to perform some action. Geometric computations/attributes can be sent to a 3-D printer, or an apparatus that manipulates matter at an atomic or molecular level (e.g. nanoscale machines/MEMs). Geometric computations/attributes can be sent to an augmented reality system. A message can be sent to a high priority receiver and/or action item entity such as law enforcement. A memory of problem and approach can be retained for future geometric analysis.

In another example use case, process 100 can be utilized to render decisions with multiple dependencies and that may intersect with the decisioning process of other individuals or groups. Example decisions of this type can include, inter alia: healthy eating choices; paths of marginal decisions (e.g. travel, budget, social interaction) decisions for a period of time; sequences of individual and/or collective marginal (and in some cases globally-consequential) decisions. Geometric nodes and methodologies (e.g. process 100) can be used to analyze, represent and develop these decisions. For example, individual and/or collective decisions can be geometrically represented and/or sequenced. In another example, a decision hierarchy and/or weighting scheme can be developed.

Taking process 100 as a template, in a first step, decision data can be received. Underlying decision space can be defined geometrically. This can include, for example (one or more) decision objects, outcome objects, and/or decision sequencing objects geometrically. Examples of data types that can be used to create a decision object include, inter alia: health/biometric data (e.g. heart rate, blood pressure etc.); travel and/or location data (e.g. GPS, change in coordinates); time data (e.g. absolute and/or relative time). The decision space can be prepared for later use. For example, it can be scaled, possible errors can be identified and corrected, etc. Acceptable tolerances for errors and time can be obtained.

Actions can be performed based on the results of the geometric node. For example, the results of the data gathering step can be retained and/or modified. The underlying decision space (e.g. as a combination of underlying data and/or variables) can be defined in geometric terms. The decision object and outcome object can be defined as geometric constructions. As described in with regards to geometric node module 204, these representations and/or constructions can be based on data, data attributes, properties, precision level, error level, predicates, computations, problem needs, etc. For example, the geometric decision and outcome objects can be represented as: a circle with a defined distance and radius, a triangle with a relation of vertices, a rectangle with a uniqueness criteria and/or hierarchy weight. A sequencing of objects can be represented as: vertex sets, incidence matrices etc. An algorithm (e.g. from a library of several embedded in the geometric node) can be chosen to construct a geometric decision, outcome or sequence of objects. The underlying decision space can be traversed by geometric operations. Example geometric operations that can be implemented in this context include: measure an outcome object; iterate through the decision space, develop alternate sequences, develop a trajectory of decisions to outcome; develop a boundary (e.g. a convex hull of outcome points); develop a trajectory (e.g. a path of vertices from decision to outcome); develop a weighting and/or recalibration (e.g. weighting or hierarchy of outcomes by indices or metrics); develop a randomization/derandomization of decision and outcome objects (e.g. geometrically-defined random behavior; grouping decision space (e.g. by attributes of decision and outcome objects found); and/or iterating or recursively performing geometric operations.

In another example use case, a combination of geometrically defined objects can be used. For example, a combination of an optimization, search, decision and outcome object can be created. For example, a text search (a geometrically defined search object) can be combined with a biometric search (another geometrically defined search object) to create a geometric text-biometric search object. This sort of search object may provide a way to analyze and query text data alongside measured human responses to the text data. The characteristics (properties, metrics, predicates, operations) of the combined object are accessible throughout the network and are amenable to further refinement. In another example, a biometric optimization object can be combined with a geographic path-sequencing object to create a biometric/geographic optimization/sequencing object which may be used to create a biometric overlay over geospatial data. Again, the characteristics (properties, metrics, predicates, operations) of the combined object are accessible throughout the network and are amenable to further refinement.

Next, a condition can be checked. An example of a condition can include determining whether a path or trajectory from a decision object to an outcome object has been found with acceptable level of error and in acceptable time or steps. If the condition has not been satisfied then previous steps can be performed again, as well as additional steps, such as obtaining additional data or user feedback.

If the condition is satisfied then the process can continue to provide a representation of the computation. Example representations of the computation can include, inter alia: geometric representation/construction of the underlying decision space, the decision/outcome/sequencing objects, alternate implementations of geometric algorithms performing geometric operations, computations/metrics/attributes/ predicates of the geometric decision/outcome etc.

Further actions can be performed based on the output of the representation of the computation. A message that includes the output of the representation of the computation can be sent throughout the network or to specific entity in the network. A message can be sent to some entity in the network to perform some action (e.g. animate, report paths). Examples of actions include inter alia: sending geometric computations, sending geometric attributes to a 3-D printer or a device for manipulation of matter at an atomic or molecular level (e.g. nanoscale machines/MEMs); sending geometric computations and/or attributes to an augmented reality system; sending a message to a high priority receiver/action item entity such as law enforcement and the like; retain memory of problem and approach for future geometric analysis.

Figure 3:
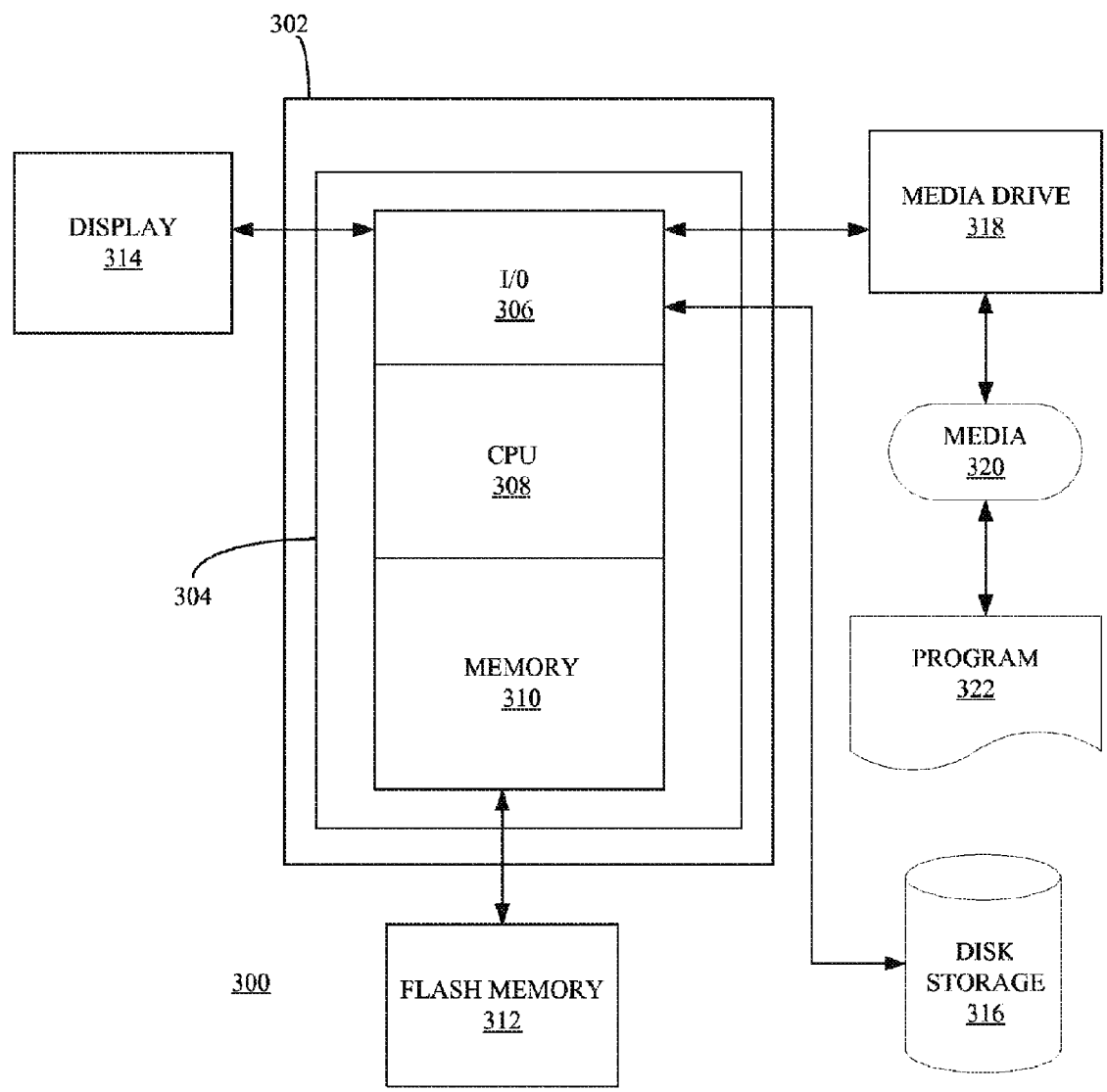
FIG. 3 depicts a computing system with a number of components that can be used to perform any of the processes described herein.

FIG. 3 depicts an exemplary computing system 300 that can be configured to perform several of the processes provided herein. In this context, computing system 300 can include, for example, a processor, memory, storage, and I/O devices (e.g., monitor, keyboard, disk drive, Internet connection, cloud, virtual, distributed network, data center, etc.). However, computing system 300 can include circuitry or other specialized hardware for carrying out some or all aspects of the processes. In some operational settings, computing system 300 can be configured as a system that includes one or more units, each of which is configured to carry out some aspects of the processes either in software, hardware, or some combination thereof.

FIG. 3 depicts a computing system 300 with a number of components that can be used to perform any of the processes described herein. The main system 302 includes a motherboard 304 having an I/O section 306, one or more central processing units (CPU) 308, and a memory section 310, which can have a flash memory card 312 related to it. The I/O section 306 can be connected to a display 314, a keyboard and/or other attendee input (not shown), a disk storage unit 316, and a media drive unit 318. The media drive unit 318 can read/write a computer-readable medium 320, which can include programs 322 and/or data. Computing system 300 can include a web browser. Moreover, it is noted that computing system 300 can be configured to include additional systems in order to fulfill various functionalities. Display 314 can include a touch-screen system. In some embodiments, system 300 can be included in and/or be utilized by the various systems and/or methods described herein.

Figure 4:
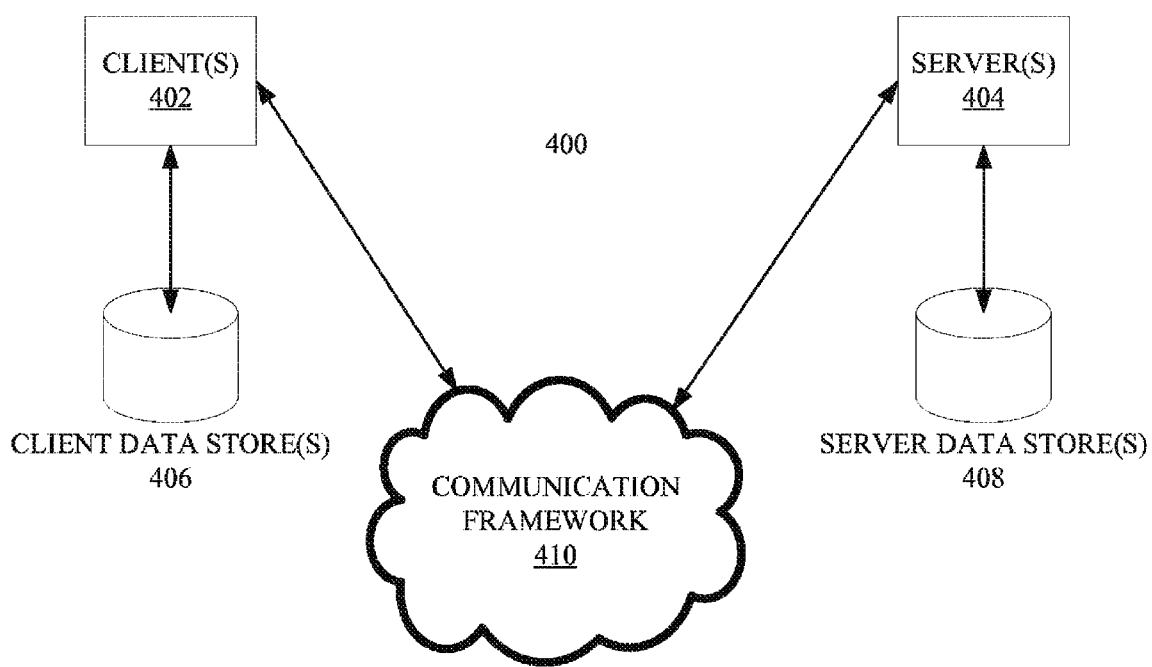
FIG. 4 depicts an exemplary computing system that can be configured to perform the processes provided herein.

FIG. 4 is a block diagram of a sample computing environment 400 that can be utilized to implement some embodiments. The system 400 further illustrates a system that includes one or more client(s) 402. The client(s) 402 can be hardware and/or software (e.g., threads, processes, computing devices). The system 400 also includes one or more server(s) 404. The server(s) 404 can also be hardware and/or software (e.g., threads, processes, computing devices). One possible communication between a client 402 and a server 404 may be in the form of a data packet adapted to be transmitted between two or more computer processes. The system 400 includes a communication framework 410 that can be employed to facilitate communications between the client(s) 402 and the server(s) 404. The client(s) 402 are connected to one or more client data store(s) 406 that can be employed to store information local to the client(s) 402. Similarly, the server(s) 404 are connected to one or more server data store(s) 408 that can be employed to store information local to the server(s) 404. In some embodiments, system 400 can be included and/or be utilized by the various systems and/or methods described herein to implement processes described herein such as process 100 as well as any process as provided herein.

At least some values based on the results of the above-described processes can be saved for subsequent use. Additionally, a (e.g. non-transients) computer-readable medium can be used to store (e.g., tangibly embody) one or more computer programs for performing any one of the above-described processes by means of a computer. The computer program may be written, for example, in a general-purpose programming language (e.g., Pascal, C, C++, Java, Python) and/or some specialized application-specific language (PHP, Java Script, XML).

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g. embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium. Finally, acts in accordance with FIGS. 1-4 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

What is claimed is:
1. A computer-implemented method comprising:
obtaining a data set from a data source;
preparing the data set for an analysis operation according to a problem type;
generating a result from an interactive geometric node based a geometric property of the data set;

determining a specified condition with the result from the interactive geometric node based on a query to the interactive geometric node; and determining a system's geometric configuration; and determining a geometric control criterion on non-smooth and non-differentiable manifolds, and wherein the geometric control criteria comprises a condition for a search, a sequencing, a system reachability, a maximality of system parameters or a minimality of system parameters.

2. The computer-implemented method of claim 1, wherein the sys comprises a dynamic data system.

3. The computer-implemented method of claim 2 further comprising: determining a dynamic property of the dynamic data system.

4. The computer-implemented method of claim 3, wherein the dynamic property is characterized as a manifold.

5. The computer-implemented method of claim 1, wherein the geometric control criteria comprises a geometric criteria for interacting with data system.

6. An apparatus for data analysis and use in a computing environment comprising:
a processor configured to execute instructions;
a memory containing instructions when executed on the processor, causes the processor to perform operations that;
obtain a data set from a data source;
prepare the data set for an analysis operation according to a problem type;
generate a result from an interactive geometric node based a geometric property of the data set;
determine a specified condition with the result from the interactive geometric node based on a query to the interactive geometric node; and
determine a system's geometric configuration; and
determine a geometric control criterion can non-smooth and non-differentiable manifolds, and wherein the geometric control criteria condition for a search, a sequencing, a system reachability, a maximality of system parameters or a minimality of system parameters.

7. The apparatus of claim 6, wherein the system comprises a dynamic data system.

8. The apparatus of claim 7, wherein a dynamic property of the dynamic data system is determined.

9. The apparatus of claim 8, wherein the dynamic property is characterized as a manifold.

10. The apparatus of claim 8, wherein the geometric control criteria comprises a geometric criteria for interacting with a data system.

* * * * *